US00RE34296E

United States Patent [19]

Roesink et al.

[11] E Patent Number: Re. 34,296

[45] Reissued Date of Patent: Jun. 29, 1993

[54] PROCESS FOR THE PREPARATION OF HYDROPHILIC MEMBRANES AND SUCH MEMBRANES

[75] Inventors: Hendrik D. W. Roesink; Cornelis A. Smolders, both of Hengelo; Marcellinus H. V. Mulder, Enschede; Dirk M. Koenhen, Dedemsvaart, all of Netherlands

[73] Assignee: X-Flow B.V., Enschede, Netherlands

[21] Appl. No.: 628,190

[22] Filed: Dec. 17, 1990

Related U.S. Patent Documents

Reissue of:

[64] Patent No.: 4,798,847
Issued: Jan. 17, 1989
Appl. No.: 99,110
Filed: Sep. 21, 1987

[30] Foreign Application Priority Data

Sep. 23, 1986 [NL] Netherlands ..... 8602402

[51] Int. Cl.[5] ..... C08G 65/00

[52] U.S. Cl. ..... 521/50; 521/61; 521/139; 521/141; 521/901; 521/905; 210/500.23; 210/500.27; 210/500.39; 210/900

[58] Field of Search ..... 521/50, 61, 139, 141, 521/901, 905; 210/500.23, 500.27, 500.39, 900

[56] References Cited

U.S. PATENT DOCUMENTS

| | | | |
|---|---|---|---|
| B 276,993 | 1/1975 | Lee et al. | 260/2.5 M |
| B 433,930 | 3/1976 | Gregor | 210/500 |
| 3,980,605 | 9/1976 | Steigelmann et al. | 428/36.6 |
| 4,664,669 | 5/1987 | Ohyabu et al. | 521/51 |
| 4,900,449 | 2/1990 | Kraus et al. | 210/651 |

FOREIGN PATENT DOCUMENTS 0082433 6/1983 European Pat. Off. .

OTHER PUBLICATIONS

European Search Report dated Nov. 19, 1987 for Application No. 87201789.2.

*Primary Examiner*—John Kight, III
*Assistant Examiner*—S. A. Acquah
*Attorney, Agent, or Firm*—Brooks Haidt Haffner & Delahunty

[57] ABSTRACT

This invention relates to a process for the preparation of hydrophilic membranes by coagulation of a solution of at least one hydrophobic polymer and at least one hydrophilic polymer in a suitable solvent medium in a coagulation medium. The process according to the invention is characterized in that hydrophilic microfiltration and/or ultrafiltration membranes are prepared by cross-linking the hydrophilic polymer which is present in or on the obtained membrane matrix after the coagulation in an essentially non-swollen state and fixing same as such in or on the polymer matrix. Advantageously the solvents and the undesirable components of the coagulation medium are removed whereby the hydrophilic polymer is converted into an essentially non-swollen state prior to cross-linking. The removal of the undesirable components from the membrane takes place by means of a non-solvent for the hydrophilic polymer according to the invention. Finally, the invention relates to hydrophilic microfiltration- and/or ultrafiltration membranes, flat or tubular of a hollow fiber structure.

13 Claims, No Drawings

PROCESS FOR THE PREPARATION OF HYDROPHILIC MEMBRANES AND SUCH MEMBRANES

Matter enclosed in heavy brackets [ ] appears in the original patent but forms no part of this reissue specification; matter printed in italics indicates the additions made by reissue.

The invention relates to a process the preparation of hydrophilic membranes by coagulation of a solution of a hydrophobic and hydrophilic polymer in a suitable solvent medium in a coagulation medium, as well as to such hydrophilic membranes.

Such a process and membranes are known from the German Offenlegungsschrift DE No. 31 49 976.

The membranes, obtained according to this known process have a water absorption ability of at least 11%, by weight, based on the total weight of the membrane at a 100% relative humidity and 25° C.

Such membranes, which are asymmetrical, are especially suitable for diffusive separations and because of their great water absorption ability.

However, the known membranes are not suitable for microfiltration and/or ultrafiltration, since the pores of the known membranes are filled with swollen hydrophilic polymer that hinders a quick passage of a permeate.

The invention aims to provide a process in which the disadvantages are obviated in an effective way.

To this end the invention comprises a process for the preparation of hydrophilic membranes by coagulation of a solution of a hydrophobic polymer and a hydrophilic polymer in a suitable solvent medium in a coagulation medium, characterized in that hydrophilic microfiltration and/or ultrafiltration membranes are prepared by cross-linking the hydrophilic polymer which is present in or on the obtained membrane matrix after the coagulation in an essentially non-swollen state and fixing same as such in or on the polymer matrix.

The present invention results in hydrophilic membranes which are especially suitable as microfiltration and/or ultrafiltration membranes. They may advantageously be applied where water is used due to their good moistening ability. The membranes according to the invention may advantageously be used for e.g. the separation of proteins, because the absorption of same is reduced to a minimum which means that the membranes are nonfouling.

In this way the hydrophilic membranes prepared according to the present process may be used by filtration of milk and dairy products, filtration of foodstuff, sterile filtration of liquids, plasmaferese and bloodfiltration and for the preparation of ultra pure water.

It will be clear that the application of the hydrophilic membranes obtained according to the invention is not restricted to the above mentioned application.

Further, the hydrophilic membranes according to the invention have as important properties that they posses a good mechanical sturdiness, are resistant to a great number of chemicals and moreover will stand high temperatures. Such membranes are in growing demand since they may be applied for the above mentioned separation purposes in an economically justified manner, the more so since the hydrophilic membranes according to the invention have a water permeability up to 8000 $l/m^2/hr/bar$ as a result of a good porosity and the hydrophilic character of the membrane material.

A favourable aspect is further that the present membrane surfaces are smooth thus causing less fouling of the surface.

The membranes according to the invention mainly have a symmetrical pore structure in the cross-section as a result of which they may be considered as absolute membranes. Besides they are especially suitable for backwashing.

The hydrophilic polymer is converted into an essentially non-swollen state prior to cross-linking by removing of the undesirable components from the polymer solution, like solvents; and from the coagulation medium like for instance water.

Such components may be removed in an efficient way by means of a non-solvent for the hydrophilic polymer. If one uses as hydrophilic polymer polyvinylpyrrolidone and as hydrophobic polymer polyetherimide and performs the coagulation in a water medium then in the first place the obtained membrane is washed with ethanol after removal from the coagulation medium and subsequently with hexane as a non-solvent for the hydrophilic polymer.

As an alternate the undesirable components may be removed from the membrane, e.g. water or other components, by means of conditioned air or gas or freezedrying after the membrane has been removed from the coagulation medium.

After removal of the above mentioned undesirable components from the membrane the cross-linking of the essentially dry hydrophilic polymer that is left behind in or on the polymer matrix, is accomplished by heating the membrane up to a temperature between 50° and 350° C.

The cross-linking of the hydrophilic polymer may also be performed in a proper way by means of suitable reagents e.g. toluenediisocyanate dissolved in hexane. Besides, cross-linking may be obtained by irradiation.

After cross-linking of the hydrophilic polymer a very stable and sturdy polymer matrix with pores is obtained, having an excellent permeability for the permeate.

It is to be understood that in the case of the known hydrophilic membranes such a stable polymer matrix with an open pore structure is out of the question.

Examples of hydrophobic polymers which, according to the present process, may be successfully applied for the preparation of the membranes according to the invention, are: polysulfone, polyethersulfone, polyetherketone, poly-2,6-dimethyl, 1,4-phenyleneoxyde and derivatives therefrom, polyetherimide, polyamides, polyimides, polyvinylidenefluoride, ideenfluoride etc., however, without any restriction.

As hydrophilic polymer a.o. polyacrylic acid, polyvinylalcohol, polyvinylacetate, polyvinylpyrrolidone, polyethyleneglycol, polyvinylpyridine, polyethyleneimine, etc. may be used, without any restriction.

According to the invention excellent results are obtained if as hydrophobic polymer polyetherimide and as hydrophilic polymer polyvinylpyrrolidone is used.

As a solvent—according to the invention—commonly N-methylpyrrolidone is used although also other suitable solvents may be applied, as dimethylsulfoxide, dimethylformamide, dimethylacetamide, etc.

Very suitable hydrophilic membranes are obtained if the ratio of polyetherimide/polyvinylpyrrolidone/N-methylpyrrolidone is 10–35% by weight/5–35% by weight/85-30% by weight and preferably 15-20% by weight/10-15% by weight/75-65% by weight.

It is to be observed that according to the present process flat, as well as tubular membranes, on a carrier or otherwise, may be prepared as membranes of a hollow fibre structure.

Furthermore, the invention ranges to hydrophilic microfiltration and/or ultrafiltration membranes flat or tubular of a hollow fibre structure, consisting of a hydrophobic polymer and a hydrophilic polymer, which hydrophilic polymer is cross-linked and is fixed in or on the polymer matrix, the membrane having pores of 0.001-10 $\mu$, a heat-resistance of up to 200° C., a water permeability of up to 8000 $l/m^2/hr/bar$, a good chemical resistance and a good mechanical sturdiness.

The process according to the invention will now be explained in more detail by way of the following non-limitative examples.

EXAMPLE I

A solution was prepared of 17 parts, by weight, of polyetherimide (Ultem 1000, trademark General Electric), 13 parts, by weight, of polyvinylpyrrolidone (M 360,000 Dalton) in 70 parts, by weight, of N-methylpyrrolidone (NMP). The polymer solution thus obtained was spun into a hollow fibre, a method which is known per se. The obtained hollow fibres were transferred into a coagulation medium consisting of water with a temperature of 20°-70° C.

After removal of the hollow fibres from the coagulation medium the fibres were dewatered by treatment with successively ethanol and hexane.

After this treatment the fibres are practically free of water in which state they were subjected to a heat treatment of 150° C. during 10-30 hours in order to crosslink the polyvinylpyrrolidone present in or on the membrane matrix.

The fibres obtained in this manner have a good resistance to chemicals, have a good mechanical sturdiness and have a heat-resistance of up to 200° C. and higher.

The fibres have a water permeability of 3000-8000 $l/m^2/hr/bar$ and a pore size of 0.5-2 $\mu$.

This membrane has a water absorbing capacity of only 4% based on the total weight at a relative humidity of 100% and at a temperature of 25° C.

EXAMPLE II

A hollow fibre membrane was prepared according to the process as described in Example I on the understanding that first of all a solution of 16 parts by weight of polyetherimide and 20 parts by weight of polyvinylpyrrolidone (M 40,000 Dalton) was prepared in 64 parts of weight of N-methylpyrrolidone (NMP). This polymer solution was subsequently spun into hollow fibre membranes.

The hollow fibres obtained in this manner have, in addition to the favourable properties mentioned in Example I, a water permeability of 200-3000 $l/m^2/hr/bar$ at a pore size of 0.05-0.5 $\mu$.

EXAMPLE III

From a polymer solution, prepared according to Example I, flat membranes were cast. As a coagulation medium water was used with a temperature of 20°-70° C., whereas the time between casting and immersing in the coagulation medium is 10-60 sec. In this manner membranes were obtained with pore sizes of 0.01-2 $\mu$and a water permeability of 200-2000 $l/m^2/hr/bar$.

EXAMPLE IV

A solution was prepared of 20 parts, by weight, of polyethersulfone (Victrex 200, trademark I.C.I.), 10 parts, by weight, of polyvinylpyrrolidone (M 360.000) and 70 parts, by weight, of N-methylpyrrolidone. The polymer solution obtained in this manner was spun into a hollow fibre. As a coagulation medium water of 20°-70° C. was used.

After dewatering (ethanol/hexane) the fibre was subjected to a heat treatment during 20 hours at a temperature of 140° C. The water permeability of the obtained hollow fibre membranes was 100-3000 $l/m^2/hr/bar$, whereas the size of the pores in the membrane was 0,1-1 $\mu$.

EXAMPLE V

A solution was prepared of 20 parts, by weight, of polyetherimide (Ultem 1000, trademark General Electric) and 5 parts, by weight, of polyvinylalcohol (M 5000) in 75 parts by weight, of N-methylpyrrolidone. From the thus obtained polymer solution flat membranes were cast, whereby as a coagulation medium water was used at a temperature of 20°-70° C. The time between casting and immersing in the coagulation medium was 10-60 sec. The membrane obtained in this manner was dewatered by means of ethanol/hexane, after which the polyvinylalcohol was cross-linked by means of 1% toluenediisocyanate dissolved in hexane.

This membrane has a pore size of 0.01-0.05 $\mu$and a water permeability of 10-200 $l/m^2/hr/bar$.

We claim:

1. Process for the preparation of hydrophilic membrane of a polymer matrix comprising
   - obtaining a membrane matrix from a solution of at least one hydrophobic polymer, at least one hydrophilic polymer, and a suitable solvent medium,
   - subjecting the membrane matrix to a coagulation medium,
   - converting the membrane matrix into an essentially non-swollen membrane matrix, and
   - cross-linking the hydrophilic polymer which is present in or on the essentially non-swollen membrane matrix such that the hydrophilic polymer is fixed in or on the polymer matrix.

2. Process according to claim 1, characterized in that the membrane matrix is converted into an essentially non-swollen membrane matrix by the removal from the membrane matrix of solvents and undesirable components of the coagulation medium whereby the hydrophilic polymer is converted into an essentially non-swollen state prior to cross-linking.

3. Process according to claim 2, characterized in that the removal of the solvents and undesirable components from the membrane matrix takes place by means of a non-solvent for the hydrophilic polymer.

4. Process according to claim 2, characterized in that the removal of the solvents and undesirable components from the membrane matrix takes place by means of conditioned air or gas.

5. Process according to any one of claims 1 or 2-4, characterized in that the cross-linking [or] *of* the hydrophilic polymer takes place by heating of the membrane up to a temperature between 50° and 350° C. *sufficient to crosslink.*

6. Process according to any one of claims 2-4, characterized in that the cross-linking of the hydrophilic polymer takes place by means of reagents.

7. Process according to claim 2, characterized in that as hydrophobic polymer polyetherimide and as hydrophilic polymer polyvinylpyrrolidone is used.

8. Process according to claim 7, characterized in that as a solvent N-methylpyrrolidone is used.

9. Process according to claim 8, characterized in that the ratio of polyetherimide/polyvinylpyrrolidone/N-methylpyrrolidone is 10–35% by weight/5–35% by weight/85–30% by weight.

10. Process according to claim 9, characterized in that the ratio of polyetherimide/polyvinylpyrrolidone/N-methylpyrrolidone is 15–20% by weight/-10–15% by weight/75–65% by weight.

11. Process according to claims 2 or 9, characterized in that a flat or tubular membrane is prepared on a carrier or otherwise.

12. Process according to claims 2 or 9, characterized in that a membrane is prepared of a hollow fibre structure.

13. Hydrophilic microfiltration- and/or ultra-filtration membranes, flat or tubular of a hollow fibre structure consisting *essentially* of a hydrophobic polymer and at least one hydrophilic polymer which *together form a polymer matrix, said* hydrophilic polymer [is] *being* cross-linked and fixed in or on the polymer matrix, *while the polymer matrix is essentially non-swollen* . the membrane having pores of 0.001–10 $\mu$, heat-resistance of up to 200° C., a water permeability of up to 8000 $l/m^2/hr/bar$, a good chemical resistance and a good mechanical sturdiness.

* * * * *